US009217995B2

(12) United States Patent
Karam

(10) Patent No.: US 9,217,995 B2
(45) Date of Patent: Dec. 22, 2015

(54) ENTERTAINMENT, LIGHTING AND CLIMATE CONTROL SYSTEM

(71) Applicant: Brian W. Karam, Ottawa (CA)

(72) Inventor: Brian W. Karam, Ottawa (CA)

( * ) Notice: Subject to any disclaimer, the term of this patent is extended or adjusted under 35 U.S.C. 154(b) by 103 days.

(21) Appl. No.: 13/948,630

(22) Filed: Jul. 23, 2013

(65) Prior Publication Data

US 2014/0028448 A1 Jan. 30, 2014

Related U.S. Application Data

(60) Provisional application No. 61/674,685, filed on Jul. 23, 2012.

(51) Int. Cl.
*G05B 11/01* (2006.01)
*G08C 19/16* (2006.01)
*G05B 15/02* (2006.01)
*H04L 12/28* (2006.01)

(52) U.S. Cl.
CPC ............ *G05B 15/02* (2013.01); *H04L 12/2834* (2013.01); *H04L 12/2898* (2013.01)

(58) Field of Classification Search
CPC ....... H02G 3/00; H02G 3/083; H02G 3/0683; H02G 3/128; H02G 3/185; G06F 12/0676; H01R 25/006; H01R 25/162; H01R 25/168; H01R 31/00; H02B 1/20; H02B 1/202; H02B 1/21; H02B 1/24; H05B 37/029
USPC ............. 340/9.16, 12.4, 870.02; 174/50, 360, 174/505, 660; 370/245, 338, 352; 455/415, 455/420; 700/65, 153, 224, 231, 249
See application file for complete search history.

(56) References Cited

U.S. PATENT DOCUMENTS

| | | | | | |
|---|---|---|---|---|---|
| 1,958,927 | A | * | 5/1934 | Reske et al. | 220/3.4 |
| 2,590,004 | A | * | 3/1952 | Givens et al. | 285/154.3 |
| 2,597,513 | A | * | 5/1952 | Murphy et al. | 138/160 |
| 3,187,085 | A | * | 6/1965 | Brackett | 174/660 |
| 3,715,627 | A | * | 2/1973 | D'Ausilio | 361/643 |
| 3,949,277 | A | * | 4/1976 | Yosset | 361/679.4 |
| 4,323,949 | A | * | 4/1982 | Guritz et al. | 361/827 |
| 4,419,535 | A | * | 12/1983 | O'Hara | 174/505 |
| 4,524,999 | A | * | 6/1985 | Pate et al. | 285/154.3 |
| 4,626,846 | A | * | 12/1986 | Parker et al. | 340/9.16 |
| 5,079,766 | A | * | 1/1992 | Richard et al. | 370/445 |
| 5,149,277 | A | * | 9/1992 | LeMaster | 439/207 |
| 5,226,120 | A | * | 7/1993 | Brown et al. | 709/224 |
| 5,406,176 | A | * | 4/1995 | Sugden | 315/292 |
| 5,438,571 | A | * | 8/1995 | Albrecht et al. | 370/408 |
| 5,473,717 | A | * | 12/1995 | Baptiste et al. | 385/76 |
| 5,550,836 | A | * | 8/1996 | Albrecht et al. | 370/461 |
| 5,719,933 | A | * | 2/1998 | Welch | 379/397 |
| 5,737,525 | A | * | 4/1998 | Picazo et al. | 709/249 |

(Continued)

FOREIGN PATENT DOCUMENTS

JP 2003207701 A * 7/2003 ............. G02B 6/44

*Primary Examiner* — Travis Hunnings
(74) *Attorney, Agent, or Firm* — Baker & McKenzie LLP

(57) ABSTRACT

Disclosed herein is a system for connecting one or more data networks to a plurality of communications devices in a premises, and methods of installing same. The system includes a hub located within the premises and connected to the data networks, as well as one or more conduits connected to the hub for connecting the data networks to one or more outlets in the premises. The outlets are adapted to connect to the communications devices to allow the user access to the networks.

15 Claims, 6 Drawing Sheets

(56) References Cited

U.S. PATENT DOCUMENTS

| | | | |
|---|---|---|---|
| 5,782,439 A * | 7/1998 | Rinderer | 248/49 |
| 5,802,148 A * | 9/1998 | Sizer, II | 379/88.19 |
| 6,076,117 A * | 6/2000 | Billings | 709/253 |
| 6,140,586 A * | 10/2000 | Imani | 174/72 C |
| 6,229,538 B1 * | 5/2001 | McIntyre et al. | 715/734 |
| 6,379,164 B1 * | 4/2002 | Cash, Jr. | 439/106 |
| 6,381,218 B1 * | 4/2002 | McIntyre et al. | 370/245 |
| 6,483,843 B1 * | 11/2002 | Su et al. | 370/425 |
| 6,542,500 B1 * | 4/2003 | Gerszberg et al. | 370/354 |
| 6,580,029 B1 * | 6/2003 | Bing | 174/360 |
| 6,846,536 B1 * | 1/2005 | Priesnitz et al. | 428/36.91 |
| 6,974,911 B2 * | 12/2005 | Hyde | 174/74 R |
| 7,136,709 B2 * | 11/2006 | Arling et al. | 700/65 |
| 7,155,305 B2 * | 12/2006 | Hayes et al. | 700/224 |
| 7,173,923 B2 * | 2/2007 | Beach | 370/338 |
| 7,594,179 B2 * | 9/2009 | Takemura et al. | 715/757 |
| 7,653,033 B2 * | 1/2010 | Beach et al. | 370/338 |
| 7,817,637 B2 * | 10/2010 | Kitani et al. | 370/392 |
| 8,045,970 B2 * | 10/2011 | Yang et al. | 455/419 |
| 8,307,201 B2 * | 11/2012 | Wakita et al. | 713/153 |
| 8,554,076 B1 * | 10/2013 | Lu | 398/60 |
| 8,649,784 B2 * | 2/2014 | Gao et al. | 455/420 |
| 8,724,639 B2 * | 5/2014 | Mahmoud | 370/401 |
| 8,781,633 B2 * | 7/2014 | Fata et al. | 700/276 |
| 2002/0141382 A1 * | 10/2002 | Winther et al. | 370/352 |
| 2003/0041161 A1 * | 2/2003 | Billings et al. | 709/231 |
| 2003/0050737 A1 * | 3/2003 | Osann, Jr. | 700/276 |
| 2006/0005983 A1 * | 1/2006 | Rizzuto, Jr. | 174/50 |
| 2012/0205153 A1 * | 8/2012 | Larson et al. | 174/88 S |
| 2012/0306661 A1 * | 12/2012 | Xue et al. | 340/870.02 |

* cited by examiner

ENTERTAINMENT, LIGHTING AND CLIMATE CONTROL SYSTEM

CROSS REFERENCE TO RELATED APPLICATION

This application claims priority to U.S. Provisional Patent Application No. 61/674,685, entitled "Smart Home Network," filed Jul. 23, 2012, which is hereby incorporated by reference in its entirety for all purposes.

TECHNICAL FIELD

This disclosure relates generally to systems for automation of residential and commercial premises and, more particularly, to an entertainment, lighting and climate control system.

BACKGROUND

Owners and occupiers of modern residential and commercial premises have come to expect to have available infrastructure to allow use of a variety of communications and media devices. This includes access to, for example, entertainment, office equipment, lighting, security, climate control and automation technologies. This typically requires connection of the premises to multiple outside service providers and entails the use of many devices to access such services.

In most premises, on-site infrastructure has been added thereto incrementally so as to accommodate use of related devices and technology based on advances in user needs and the technology itself. More aged properties were not designed or built bearing in mind the rapid advances in communications and media technology of the past several years. This results in inefficiencies in terms of placement, integration and operation of communications and media devices and related infrastructure (which includes, for example, wiring, modems, receiver boxes, control panels). These inefficiencies manifest themselves through obtrusive and unsightly placement of wiring, redundancy or lack of conveniently located outlets for attachment of wired devices and related hardware. This can result in under served users or inefficient use of resources such as electricity, through running more devices than needed to accomplish certain goals.

As systems have been installed in a piece meal manner, difficulties arise in securing service or maintenance thereof. Multiple providers may need to be engaged, heightening costs and increasing the time needed for maintenance or repairs. This can result in costly downtime in business applications and/or inconvenience in residential applications.

Even properties designed and constructed more recently have not been provided in a manner so as to alleviate these inefficiencies. This is particularly problematic in smaller commercial or residential properties (e.g., condominiums) where space is precious and post-construction alterations are quite onerous if not entirely impractical.

During the construction and installation process, there is a need to increase consistency between systems installed in multiple units within developments of residential or commercial properties (e.g., sub-divisions, hotels, conference centers, multi-unit dwellings, condominiums or other developments) so as to heighten benefits vis-à-vis efficiency of construction, maintenance and support of installed systems.

Further, as communications and other technology has advanced, consumers will often use multiple different service providers for their internet, security, television, climate control and other services. Related disparities in systems lead to duplications of hardware and exacerbate the problems discussed above.

There is a need to provide systems and methods for efficiently and effectively providing access to communications and entertainment devices, as well as placement of related infrastructure within premises in an unobtrusive manner. There is also a need to provide such systems and methods in a manner that facilitates efficient installation, support and repair in both commercial scale environments and for more cost sensitive individual users. Further, since technological advances can be expected to continue, there is also need to provide such systems and methods with capability for expansion or adaptation to changing and advancing technology.

BRIEF SUMMARY

An exemplary embodiment of the present disclosure may include a system for connecting one or more data networks to a plurality of communications devices in a premises. The system may include a hub located within the premises and connected to the data networks. The system may also include one or more conduits connected to the control hub for connecting the data networks to one or more outlets in the premises. The outlets may be provided with parts to connect to specific communications devices to specific networks.

In an embodiment, each of the conduits may comprises a bundle of wires within a sheath, and each wire may be connected to one of the networks.

In an embodiment, each of the outlets may comprise a plurality of ports. Each of the ports may be connected to one of the wires and adapted for connection of one of the devices thereto.

In an embodiment, the outlets may further include indicia provided thereon for identifying and differentiating between the ports. The indicia may comprise labels with one or more of text and symbols provided thereon.

In an embodiment, the system may further comprise a controller to implement control signals based on input from a user for controlling operation of the devices.

The present disclosure may also include a method of installing home automation systems in a plurality of premises. The method may include the steps of providing a hub within each of the premises and connecting the hub to one or more data networks, as well as connecting one or more conduits each to the hub and to an outlet at a location in the premises. The hub may be adapted to connect to one or more communications devices to enable connection of the devices to the networks.

In an embodiment of the method, the conduits may each comprise a bundle of wires within a sheath. Each of the wires may be connected to a respective one of the networks.

In an embodiment of the method, each outlets may comprise a plurality of ports, each connected to a respective one of the wires to enable connection of the devices to the networks.

In an embodiment of the method, a further step of providing indicia on the outlets for identifying and differentiating between the ports may be included. The indicia may comprise labels with one or more of text and symbols thereon.

In an embodiment of the method, the ports in each outlet in each of the premises may be provided in the same arrangement in the systems in each of the premises In an embodiment of the method, a step of providing a controller configured to implement control signals based on input from a user, and for controlling the function of the communications devices, may be included.

DETAILED DESCRIPTION

Figure 1:
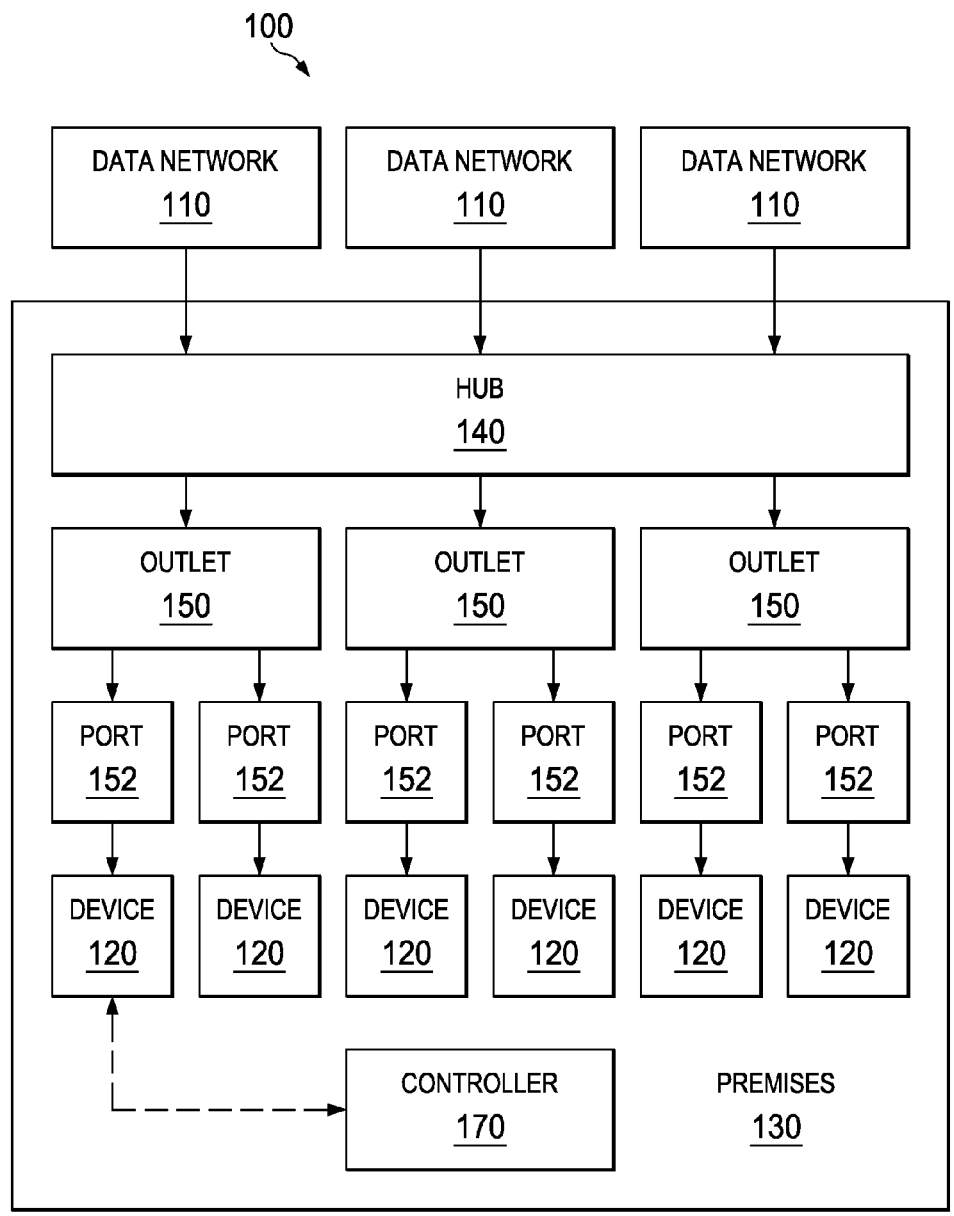
FIG. 1 illustrates a schematic depiction of a system according to the present disclosure.

The current disclosure enables a system 100 for connecting one or more data networks 110 to one or more communications devices 120 in a premises 130. The system 100, shown in FIG. 1 in a schematic manner, comprises a hub 140 that is located within the premises 130 and is connected to the data networks 110. Data networks 110 may include, for example, fibre-optic and other digital data connections provided by Internet service providers (such as carriers), but may also include connections to external servers of providers of security, climate control and other systems. Devices 120 provided as part of or for use with the system may include, for example, home theatre equipment, multi-room music systems, lighting systems, security integration systems and related equipment, and comfort and energy management systems, including climate control systems.

Figure 7:
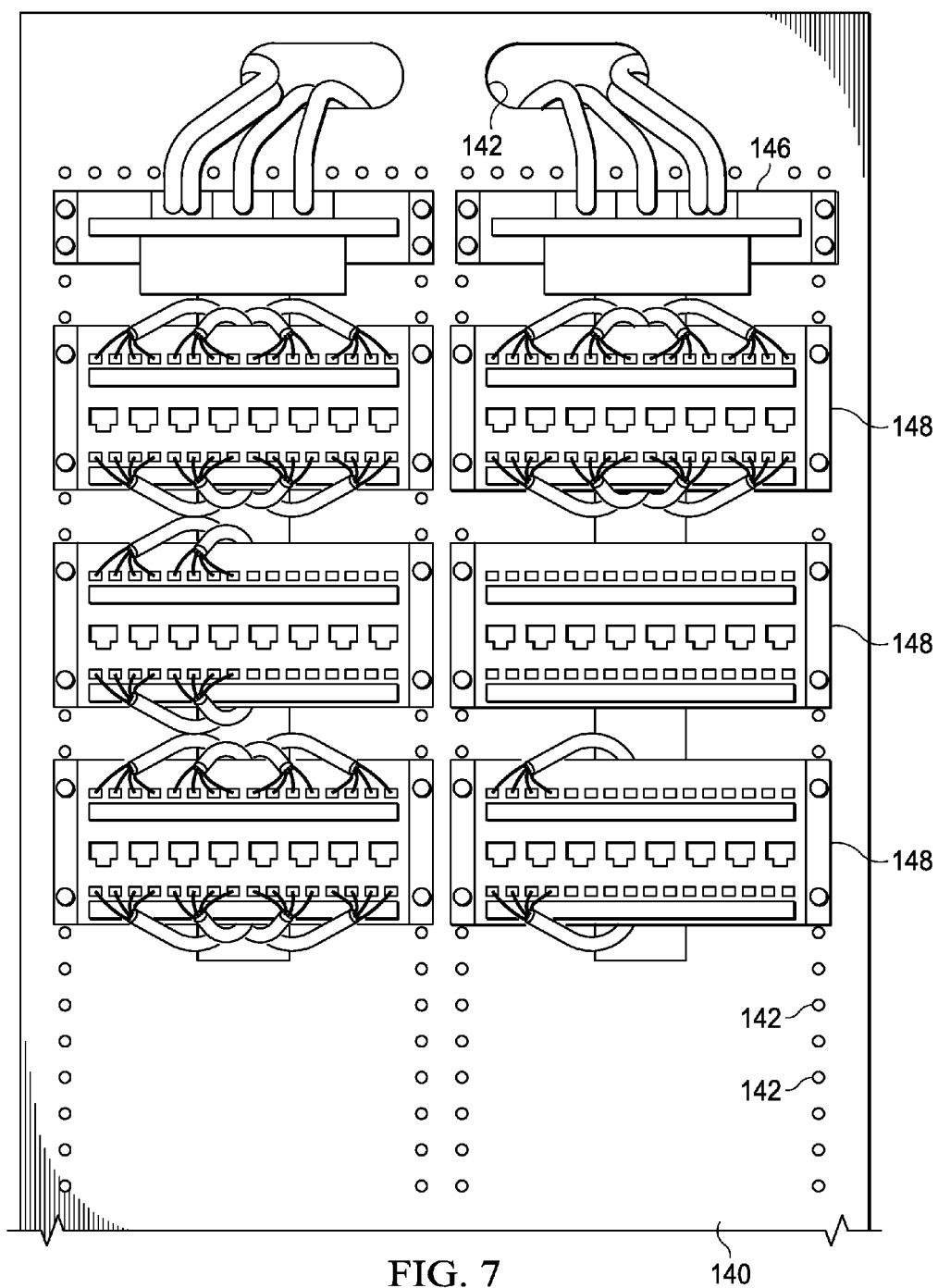
FIG. 7 illustrates a partial front view of a hub without service provider hardware.
Figure 8:
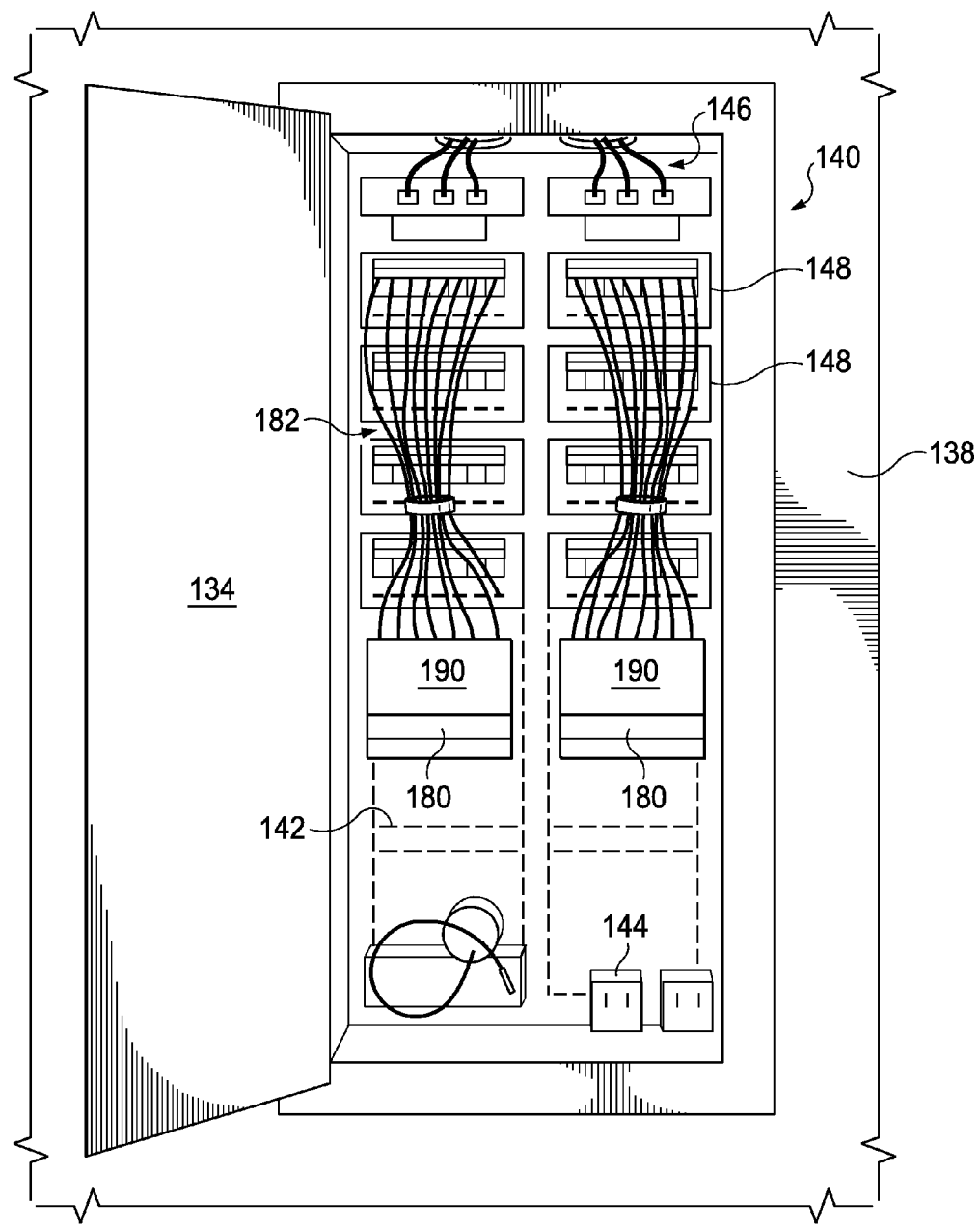
FIG. 8 illustrates a front view of a hub with service provider hardware therein.

The hub 140 may comprise a 34"×14" or similarly sized structured wiring panel cabinet 140, for example, as shown in FIGS. 7 and 8. Such a cabinet 140 may be secured, for example, adjacent one or more framing studs 138 and may include holes 142 for wiring and electrical outlets. The hub 140 will typically be provided with extra space and thereby allow easy replacement or interchange of components, to facilitate inclusion of additional systems and/or upgrade of any current components with minimal impact on the ongoing user experience. Such changes may be necessitated by, for example, user needs and/or advances in communications, entertainment and home automation technologies. This adaptability provides users (not shown) with greater confidence that the system 100 will not quickly be rendered obsolete, by combining the benefits of an integrated system 100 with the possibility of modular changes and growth.

Figure 5:
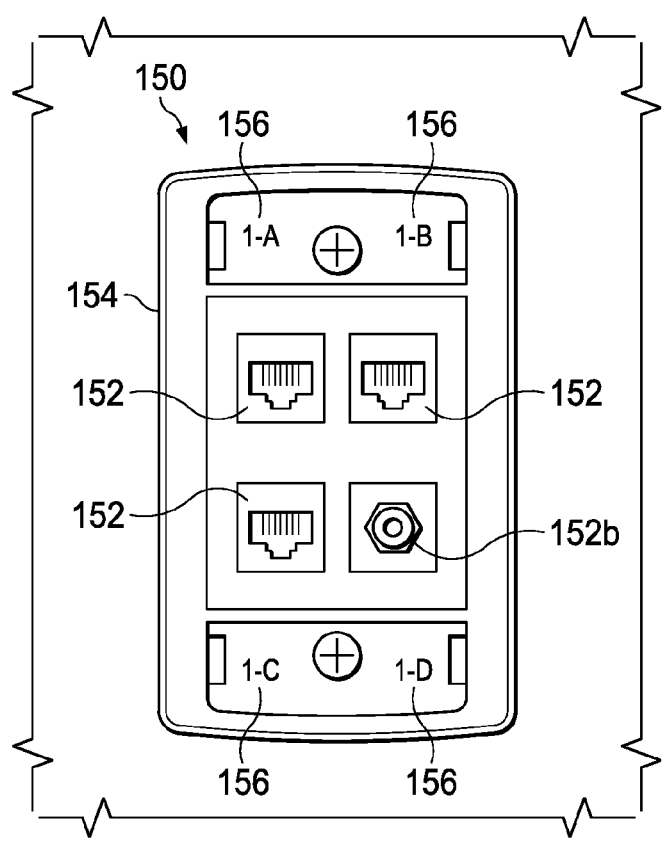
FIG. 5 illustrates a front view of an outlet, showing the ports thereof labeled with indicia.

Typical positioning for such a cabinet 140 in a multi-level premises may be, for example, beneath the stairs thereof with a door 134 of the cabinet 140 outwardly facing to facilitate access thereto. The cabinet 140 may contain one or more electrical outlets 144 to power any active hardware provided therein. A surge protector (not shown) may be provided in order to protect any devices sensitive to interruptions or surges in power. Splitters 146, for example, RG6-type cable (i.e., coaxial cable) may be provided to split outgoing coaxial/TV signals to each of ports 152 in outlets 150 in the premises 130 consisting of an RG6 jack 152b (as shown in FIG. 5). The number and nature of the cable splitters 146 (e.g., 4-way; 8-way, etc.) will depend on the number of related ports 152 in the premises 130. Data distribution modules 148 will be provided in the hub 140 as the termination for each CAT6-type Ethernet or data wiring run in the premises 130, and may be connected to network switches via shorter patch cables (not shown). Numbers of such modules 148 will depend on the needs in the particular premises 130. Telephone signals may also be split to the various port(s) 152 in the premises consisting of jacks for same.

Mounting hardware 180 may be provided to mount equipment 190 of the Internet or other service providers within the hub 130. Examples include hook and loop or other suitable fasteners 160 (as shown in FIG. 8) depending on the size, weight and desired positioning of the hardware 190 involved. CAT6-type, RG6-type, and any other needed patch cables 182 will be installed in the hub 130, as needed in the particular application.

Figure 9:
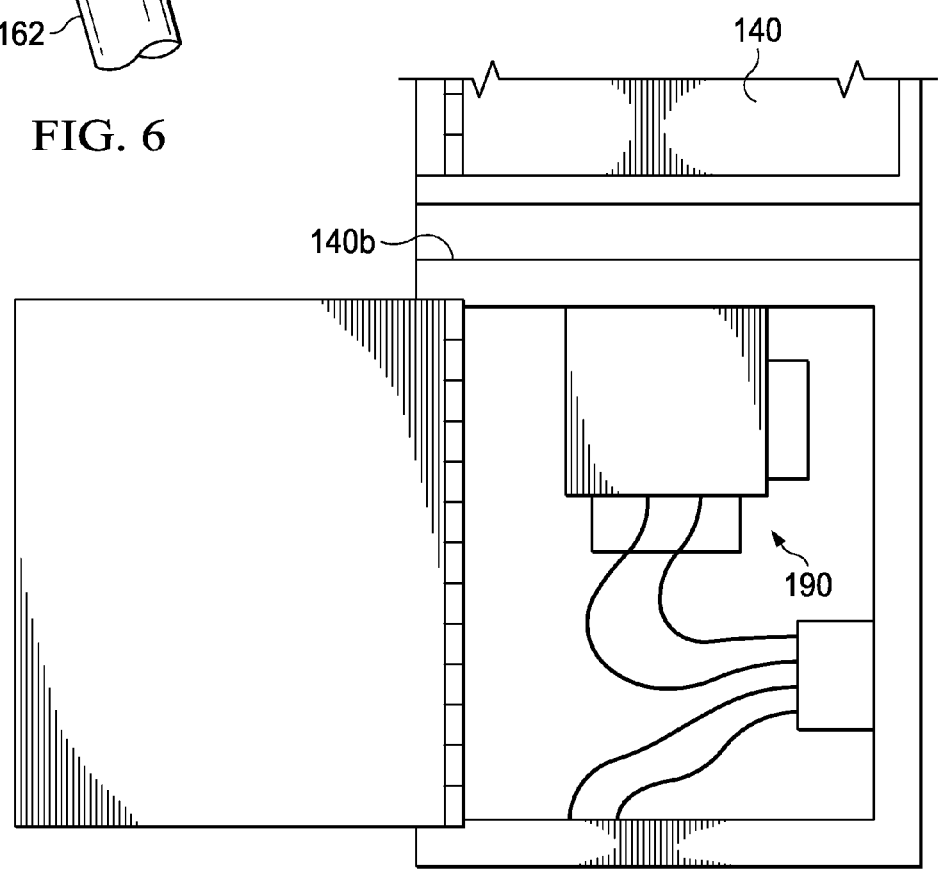
FIG. 9 illustrates a front view of a second cabinet.

As shown in FIG. 8, the hub 130 will be laid out in an organized manner, so as to avoid wire tangles and facilitate later repair, upgrade or maintenance. Service providers (e.g., Internet) may install certain hardware 190 in the premises and it may be advantageous to provide a second cabinet 140b to allow for room for same (e.g., as shown in FIG. 9). In some instances, hardware such as a telephony modem or data modem/router may be placed within or atop the cabinet, if needed (not shown).

In some embodiments, capabilities vis-à-vis certain services may be adjusted to meet the needs of the particular user(s). For example, adjustments may be made to data networking specifications to maximize efficiency and desired performance in a particular premises 130 or group of same. Further, integration steps particular to the security, home automation and entertainment solutions and products provided by various service providers will be apparent to one skilled in the art when presented with the features thereof in the context of installing systems according to the present disclosure.

Incoming data, cable, and telephony lines are connected to the hub 130, typically at the top thereof and each to their respective componentry, as detailed herein. In certain embodiments, connection of service provider infrastructure to the premises may precede or follow installation of the components of systems 100 according to the present disclosure.

Figure 3:
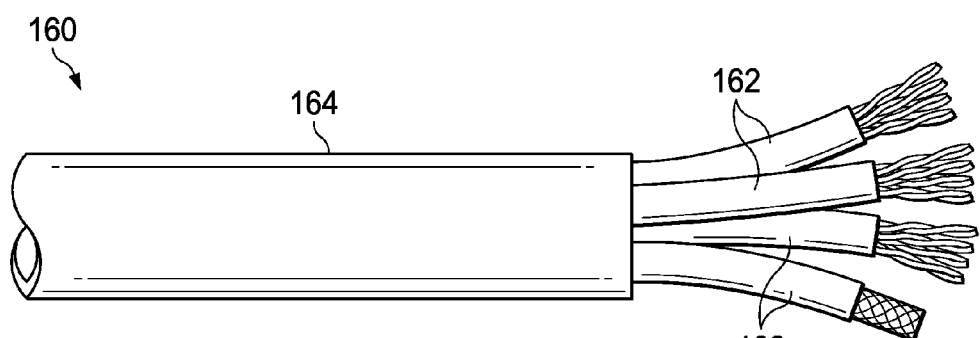
FIG. 3 illustrates a segment of conduit with the sheath removed from an end thereof to show wires enclosed therein.
Figure 4:
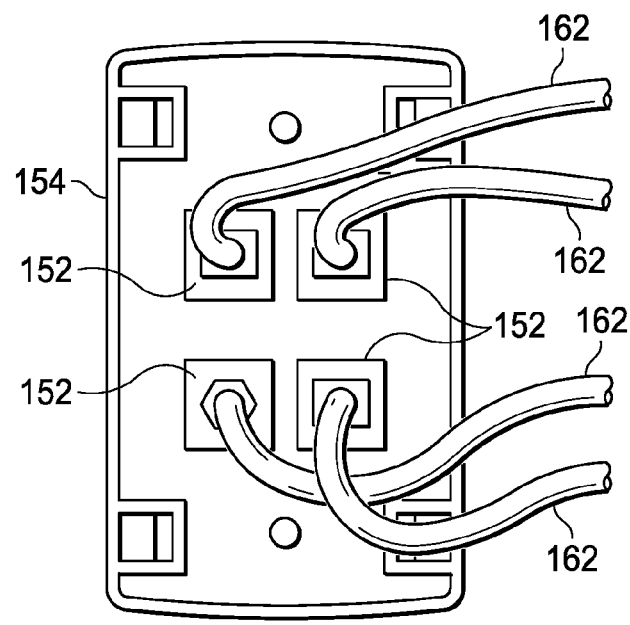
FIG. 4 illustrates a back view of a faceplate of an outlet with wires connected one each to the ports of the outlet.

One or more conduits 160, for example a plurality of wires 162, bundled within a common sheath 164, as shown in FIG. 3 and schematically in FIG. 1, are connected to the hub 140 for connecting the data networks 110 to the outlets 150 in the premises 130, as shown in FIGS. 4 and 5. The conduits 160 may be provided with various combinations of wires 162 therein, depending on the needs of the particular premises 130 and, indeed, at the location of the particular outlet 150. For example, and as shown in FIGS. 4 and 5, a conduit 160 comprising a bundle of four wires 162 may terminate at and connect to a 4-port multimedia faceplate 154 of an outlet 150 wherein three of the ports 152 thereat comprise RJ45-type data/network jacks (i.e., which can alternatively be used for voice or other data, as required in the particular application—top left, top right and bottom left in FIG. 5), and 1 RG6-type cable/television jack (i.e., coaxial cable—bottom right in FIG. 5). The particular arrangement and number of ports 152 to be provided in any outlet 150, as well as the number and arrangement of outlets 150 to be provided in any premises 130, are design choices to be made by a person skilled in the art.

Certainly, particular devices 120 and ports 152, and the relative arrangement of same can be customized based on the needs of a particular community or development in which the premises 130 are situated. For example, the needs of units in a residential sub-division may be different than those in a multi-unit commercial property.

Examples of wiring products that may be employed in the disclosed system 100 include those that may provide four or more communication wires 162 within a single sheath 164 (or jacket), as shown in FIG. 3. This bundled approach reduces labor, simplifies high-voltage crossings and streamlines termination & organization of communication wiring. Providing conduits 160 in this manner also facilitates placement thereof within walls of premises 130 to minimize impact on the space of the particular commercial property or residential property. This provides for a cleaner approach. This advantage couples with strategically placing outlets 150 so as to optimize the distance thereof from the various devices 120 to be connected thereto. Further, the particular arrangement of ports 152 in each outlet 150 may be varied by location within the particular premises 130 so as to maximize efficiency, vis-à-vis distance travelled by any cables or wires needed to connect devices to the ports.

Figure 2:
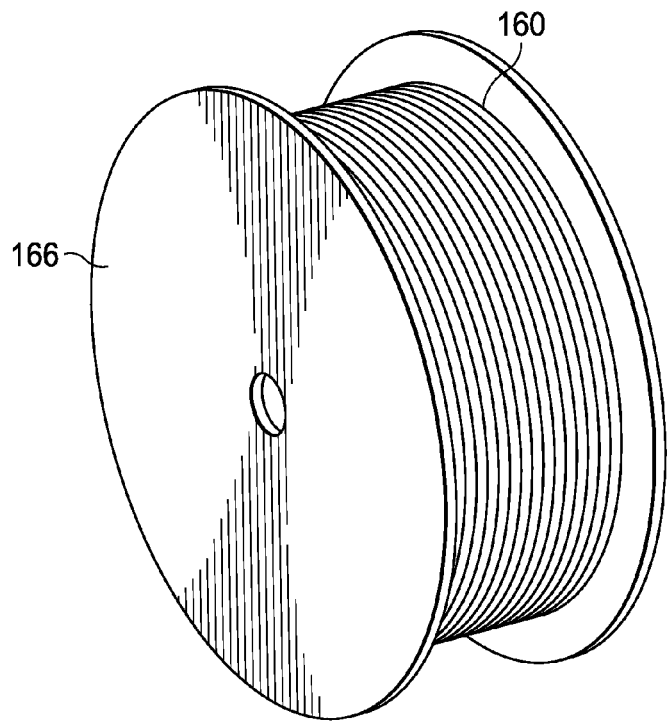
FIG. 2 illustrates a spool of conduit.

For installation purposes, conduits 160 may be provided on a large spool 166, as shown in FIG. 2. For developers, this facilitates speedy provision of lengths of conduit 160 needed to outfit any premises 130, as well as facilitating economies of scale with relation to purchasing supplies.

As will be appreciated from a review of FIG. 5, the ports 152 and outlets 150 are adapted to connect to the communications devices 120 to allow the user access to the networks 110. Each of the wires 162 is connected to one of the networks 110. As shown in FIGS. 4 and 5, each outlet 150 includes multiple ports 152. As shown in FIG. 4, each port 152 is connected to one of the wires 162 to enable connection of one of the devices 120 to the network 110 to which such wire 162 connects.

As shown in FIG. 4, the outlets 150 may include indicia 156 provided thereon for identifying and differentiating between the ports 152. The indicia 156 may, for example, include labels having text and/or symbols thereon. These labels 156 could be provided with adhesives on them for attachment to, or may be etched into, the faceplate 154 of the outlet 150. The labels 156 could also be differently colored so as to facilitate identification of the network 110 to which each port is connected and/or the type of device 120 that is to be connected thereto.

For example, ports 152 may be labeled with stickers beneath them such that an installer can more easily identify & troubleshoot specific runs of wiring, as may be required during repairs or maintenance of systems according to the present disclosure. For example, in FIG. 5 the labels "1A", "1B", "1C", and "1D" are each used. The particular labels 156 used may be highly descriptive (e.g., "Phone", "Data", etc.) or may be as shown in FIG. 5, wherein these entries correspond to terms that will be known to installers and maintenance persons dealing with such systems (e.g., for a particular community or development) such that these persons are aware of the meaning of each label 156.

Figure 6:
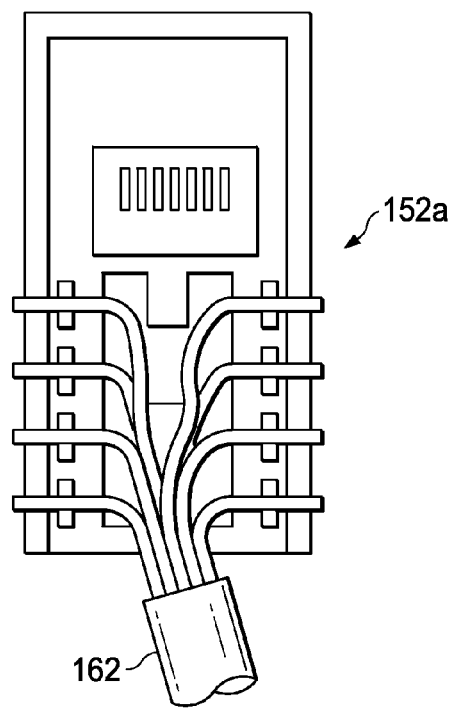
FIG. 6 illustrates a top view of a telephone jack connected to a wire.

Ports 152 consisting of data and/or telephone jacks (See, for example, FIG. 5) will be configured using the standards applicable to the respective types of jacks. For example, telephone jacks 152a may be configured to the EIA/TIA 568A standard, as shown generally in FIG. 6. Ports 152 may be configured to connect with various types of devices and cables for same including, for example, television receiving and decoding boxes, such as HDTV digital set-top boxes and the like, as well as Internet-based telephony systems (e.g., voice over internet protocol).

The various outlets 150 provided in any premises 130 may be assigned numbers or other identifiers that may correspond to identifiers on the hub 140 or other termination hardware in the premises 130. This labeling practice saves time during installation and maintenance of systems 100 disclosed herein. Digital markings such as barcodes and the like may be used to facilitate machine identification of jacks and respective termination points. Wiring installed as part of systems of the present disclosure may be provided with slack on the run between the hub 140 and the port 152 so as to allow maintenance that may necessitate wire trimming and otherwise facilitate maintenance.

A controller 170 may be provided in order to enable a user (not shown) to provide input aimed at controlling the devices 120. This controller 170 may consist of, for example, a handheld computer (e.g., tablet, smart phone or otherwise) provided with software application(s) enabling the sending of control signals (either wirelessly or through wired connections, to the devices 120. User input may be provided, for example, by way of selecting and entering commands through a graphical user interface and tactile input (e.g., through a touch screen). In some embodiments, commands may be provided by way of user voice.

A method 200 of installing in multiple premises 130, a system 100 according to the present disclosure, and as described above, may comprise the steps of: providing a hub 140 (such as that described above) within each of the premises 130 and connecting the hub 140 to one or more data networks as described herein; connecting conduits 160 each to the hub 140 and to outlets 150 at locations in the premises 130. If installing multiple systems 100 in multiple premises 130, such as in a multi-unit development (e.g., sub-division, condominium building), ports in the outlets in similar locations (e.g., outlets adjacent rooms in which televisions and home theatres, and the like, are provided). Such consistency facilitates rapid installation and allows for technicians to become especially familiar with particular communities or groups of premises. The method 200 may also include the step of providing a controller 170, as described above.

The terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A system for connecting a plurality of devices in a premises to a plurality of data networks, wherein the system comprises:
   a hub configured to connect to a first data network and a second data network, wherein the first data network and the second data network are different;
   an outlet comprising a first port and a second port, wherein the first port comprises a first port type configured to connect to a first device, and wherein the second port comprises a second port type configured to connect to a second device,
      wherein the first device is enabled to access the first data network via the first port, and
      wherein the second device is enabled to access the second data network via the second port; and
   a conduit connecting the hub to the outlet, wherein the conduit comprises a first wire connecting the hub to the first port and a second wire connecting the hub to the second port, and
   wherein the first wire is enabled to access of the first data network via the hub, and
   wherein the second wire is enabled to access the second data network via the hub.

2. A system according to claim 1,
   wherein the conduit further comprises a sheath covering a bundle of wires, and
   wherein the bundle of wires comprises at least the first wire and the second wire.

3. A system according to claim 1,
   wherein the hub comprises at least one splitter configured to split at least one of a first data network signal and a second data network signal.

4. A system according to claim 1, wherein the outlet further comprises indicia provided thereon for identifying and differentiating between the first port and the second port.

5. A system according to claim 4, wherein the indicia are selected from one or more text characters, one or more symbols, a barcode, or any combination thereof.

6. A system according to claim 1, further comprising a controller to implement control signals based on input from a user.

7. A system according to claim 6, wherein the controller comprises a handheld computer wirelessly connected to at least one of the plurality of devices.

8. A system according to claim 1,
   wherein the first data network and the second data network are selected from: an internet network, a fiber optic network, a digital network, a cable network, a security network, a television network, and a climate control network.

9. A method of installing a device control system configured to connect a plurality of devices in a premises to a plurality of data networks, said method comprising the steps of:
   (a) providing a hub configured to connect to a first data network and a second data network, wherein the first data network and the second data network are different;
   (b) providing a conduit comprising a first wire and a second wire, wherein the first wire is enabled to access the first data network via the hub, and wherein the second wire is enabled to access the second data network via the hub;
   (c) providing an outlet comprising a first port and a second port, wherein the first port comprises a first port type configured to connect to a first device, and wherein the second port comprises a second port type configured to connect to a second device;
   (d) connecting a first end of the first wire to the hub and a second end of the first wire to the first port of the outlet; and
   (e) connecting a first end of the second wire to the hub and a second end of the second wire to the second port of the outlet such that the first device accesses the first data network via the first port and the second device accesses the second data network via the second port.

10. A method according to claim 9,
    wherein the conduit further comprises a sheath covering a bundle of wires, and
    wherein the bundle of wires comprises at least the first wire and the second wire.

11. A method according to claim 9,
    wherein the hub comprises at least one splitter configured to split at least one of a first data network signal and a second data network signal.

12. A method according to claim 11, further comprising providing indicia on the outlet for identifying and differentiating between the first port and the second port.

13. A method according to claim 12, wherein the indicia are selected from one or more text characters, one or more symbols, a barcode, or any combination thereof.

14. A method according to claim 9, further comprising:
    providing a controller configured to implement control signals based on input from a user, for controlling the function of at least one of the plurality of devices.

15. A method according to claim 9,
    wherein the first data network and the second data network are selected from: an internet network, a fiber optic network, a digital network, a cable network, a security network, a television network, and a climate control network.

* * * * *